UNITED STATES PATENT OFFICE.

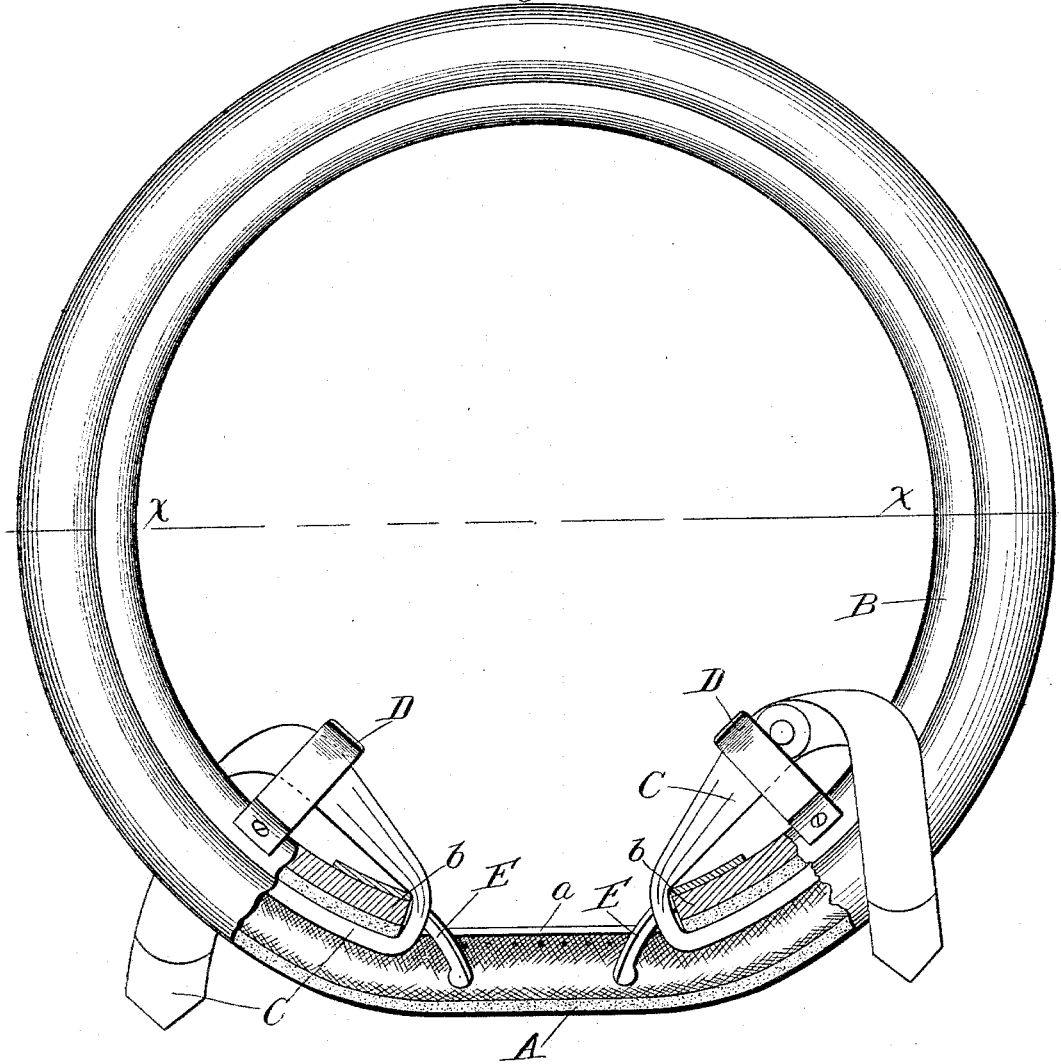

JAMES F. LAWRENCE, OF CHICAGO, ILLINOIS, ASSIGNOR TO THE MORGAN & WRIGHT, OF SAME PLACE.

MEANS FOR MAKING PNEUMATIC TIRES.

SPECIFICATION forming part of Letters Patent No. 584,164, dated June 8, 1897.

Original application filed March 29, 1897, Serial No. 629,823. Divided and this application filed April 7, 1897. Serial No. 631,088. (No model.)

*To all whom it may concern:*

Be it known that I, JAMES F. LAWRENCE, a citizen of the United States, residing at Chicago, in the county of Cook and State of Illinois, have invented a certain new and useful Improvement in Means for Making Pneumatic Tires, of which the following is a specification.

My invention relates to the production of a construction of pneumatic tire involving a tubular casing and a separately-vulcanized tubular lining which is partially cemented to the inner wall of the casing. Said invention contemplates the introduction of a rubber tube having closed ends within a tubular casing, and also contemplates subjecting the inner tube to longitudinal tension after it has been drawn within the casing, whereby the said tube will be held against the inner wall of the casing, along the side of the latter, and thereby permit cement introduced within such casing to be spread along its inner wall, at the tread side thereof, by properly manipulating the casing. In this way a portion only of the inner wall of the casing can be covered with cement, so that when the inner tube is subsequently inflated it will be free or uncemented along the inner wall of the casing, at the base side thereof, and be caused to adhere to the remaining portion of such inner wall.

In my application, Serial No. 629,823, filed March 29, 1897, I have described devices for opening the casing at a portion thereof having a short slit and for supporting the casing and holding under tension both tubes having closed ends and tubes having telescoped ends. In said application I have made generic claims covering devices for holding both of said tubes and have also specifically claimed the device for holding tubes having telescoped ends. My present application is filed as a division of said application, Serial No. 629,823, and is intended to specifically claim the device for holding tubes having closed ends.

In the accompanying drawings, Figure 1 shows the casing and a support therefor, partly in elevation and partly in longitudinal section. In this view the inner tube having closed ends has its end portions drawn out from the casing and held by clips or holders on said support. Fig. 2 is a section on line $x\ x$, looking downward.

The pneumatic-tire casing A is of ordinary construction and is provided with a comparatively short slit $a$ along its base. The annular support B, upon which the annular tubular casing A is temporarily held, is practically an ordinary tire-rim having a portion cut away so as to leave a gap between its ends $b\ b$. By such arrangement the base portion of the casing A can rest upon this support and can be arranged so that its slit $a$ will be opposite the gap in said annular support. By thus forming the annular support with a gap it can also be contracted in diameter, so as to permit the casing to be readily placed upon it, and after the casing is in place the annular support can be allowed to spring out and expand, so as to properly engage and hold the casing and maintain the same in a properly-extended condition.

The inner tube C has its ends closed in any known or suitable way—for example, by pinching them, as in the Morgan & Wright tires, although other known ways of closing such ends can be employed. This inner tube can be introduced within the casing either before or after the latter has been placed upon the annular support, as may be preferred.

The annular holder A is provided with a couple of clips or tube-holders D D, arranged at opposite sides of its gap and adapted to engage and hold the end portions of the inner tube when such end portions of the inner tube are drawn out through the slit $a$ in the casing. By such arrangement the inner tube can be drawn taut, so that it will lie at the base side of the casing—that is to say, it will lie against the inner wall of the tire-casing, at the base side of the latter. The annular support for the casing is also provided with spreaders or spreader-plates E E, arranged at opposite sides of its gap and adapted to extend through the slit $a$ in the base of the casing, so as to hold such slit open, as in Fig. 2. After the tube has been thus drawn taut and its ends caught by the holders D a suitable quantity of liquid cement can be poured into the casing through the expanded slit therein, and by bodily turning the casing and its support as a whole the cement will run along the inner wall of the casing at the tread side thereof, and any surplus can be readily emptied out through the expanded slit. After such process the casing is to be removed from the support, the ends of the inner tube tucked in the casing, the slit in the casing closed by lacing or other suitable means, and the inner tube inflated through its usual valve. This inflation of the inner tube will cause it to unite with the cement-coated portion of the casing, while the portion of the inner tube next to the base of the casing will be free and uncemented. With such construction the tube will be held against any tendency to creep, and in case of large punctures or ruptures the casing can be split and opened at any desired point along its base without injury to its tubular lining formed by the inner tube, which latter can also at any desired point be pulled away from the casing to which it is cemented, and after patching the puncture or rupture said portion of the inner tube can be again cemented to the casing.

While various forms of clips or holders can be employed, I prefer employing spring-clips as an extremely simple means for holding the end portions of the inner tube.

What I claim as my invention is—

1. A device for use in the cementation of inner tubes to the inner walls of tubular-tire casings, comprising an annular support for the casing having a gap or opening, and holders arranged at opposite sides of such gap or opening and adapted for holding the end portions of an inner tube drawn out from an opening in a casing upon said support, substantially as set forth.

2. A device for use in the cementation of inner tubes to the inner walls of tubular-tire casings, comprising an annular support B for the tire-casing having a gap or opening, and spring-clips D arranged upon said support at opposite sides of its gap or opening, substantially as described.

JAMES F. LAWRENCE.

Witnesses:
A. F. DURAND,
MARGARET M. WAGNER.